United States Patent
Veldman et al.

(10) Patent No.: US 11,910,502 B2
(45) Date of Patent: Feb. 20, 2024

(54) LED DRIVER FOR LED LIGHTING SYSTEMS FOR REPLACING A HIGH-INTENSITY DISCHARGE LAMP

(71) Applicant: SIGNIFY HOLDING B.V., Eindhoven (NL)

(72) Inventors: Paul Robert Veldman, Oss (NL); Jie Fu, Shanghai (CN); Haimin Tao, Eindhoven (NL); Gang Wang, Shanghai (CN); Zhiquan Chen, Shanghai (CN); Jian Longqui, Eindhoven (NL)

(73) Assignee: SIGNIFY HOLDING B.V., Einhoven (NL)

( * ) Notice: Subject to any disclaimer, the term of this patent is extended or adjusted under 35 U.S.C. 154(b) by 120 days.

(21) Appl. No.: 17/770,022

(22) PCT Filed: Oct. 20, 2020

(86) PCT No.: PCT/EP2020/079418
§ 371 (c)(1),
(2) Date: Apr. 18, 2022

(87) PCT Pub. No.: WO2021/078700
PCT Pub. Date: Apr. 29, 2021

(65) Prior Publication Data
US 2022/0394831 A1 Dec. 8, 2022

(30) Foreign Application Priority Data

Oct. 24, 2019 (WO) ................ PCT/CN2019/113078
Nov. 15, 2019 (EP) ..................................... 19209571

(51) Int. Cl.
*H05B 45/30* (2020.01)
*H05B 45/3578* (2020.01)
(Continued)

(52) U.S. Cl.
CPC ....... *H05B 45/3578* (2020.01); *H05B 45/355* (2020.01); *H05B 45/3725* (2020.01)

(58) Field of Classification Search
CPC .... H05B 45/39; H05B 45/325; H05B 45/327; H05B 45/355; H05B 45/375; H05B 45/382; H05B 45/3578; H05B 45/3725
See application file for complete search history.

(56) References Cited

U.S. PATENT DOCUMENTS 8,330,391 B2 * 12/2012 Wendt ................ H02M 3/3376
315/307
9,225,254 B2 * 12/2015 Christoph ......... H02M 3/33573
(Continued)

FOREIGN PATENT DOCUMENTS

| CN | 103621182 B | 6/2016 |
| JP | 2015511479 A | 4/2015 |
| JP | 2017199628 A | 11/2017 |

OTHER PUBLICATIONS

J.R. Rodriguez et al: "PWM regenerative rectifiers: state of the art", IEEE Transactions on Industrial Electronics, vol. 52, No. 1, Feb. 1, 2005, pp. 5-22, XP055423362, ISSN: 0278-0046, DOI: 10.1109/TIE. 2004.841149.

*Primary Examiner* — Tung X Le (57) ABSTRACT

An LED driver for an LED lamp, which also comprises an LED load. The LED driver is adapted to connect to an input source at a first and second terminal. The LED driver comprises a switching arrangement configured to enable a controller to control at least a magnitude and phase of the voltage between the first and second terminals. The phase of the voltage between the first and second terminals may be defined to control an amount of power that flows from the input source to power the LED lamp.

8 Claims, 6 Drawing Sheets

(51) Int. Cl.
  *H05B 45/355*    (2020.01)
  *H05B 45/3725*   (2020.01)

(56) References Cited

U.S. PATENT DOCUMENTS

| | | | |
|---|---|---|---|
| 9,357,607 B2 | 5/2016 | Kahlman et al. | |
| 2009/0273301 A1* | 11/2009 | De Anna | H05B 45/382 |
| | | | 315/294 |
| 2012/0293072 A1* | 11/2012 | Chang | H05B 45/327 |
| | | | 315/121 |
| 2013/0313059 A1 | 11/2013 | Inarida et al. | |
| 2015/0028761 A1* | 1/2015 | Vonach | H05B 45/382 |
| | | | 315/201 |
| 2015/0181557 A1 | 6/2015 | Tao et al. | |
| 2015/0181667 A1 | 6/2015 | Tao et al. | |
| 2016/0270170 A1* | 9/2016 | Mishima | H05B 45/325 |
| 2017/0070096 A1 | 3/2017 | Madawala et al. | |
| 2018/0278181 A1 | 9/2018 | Afridi et al. | |

\* cited by examiner

LED DRIVER FOR LED LIGHTING SYSTEMS FOR REPLACING A HIGH-INTENSITY DISCHARGE LAMP

CROSS-REFERENCE TO PRIOR APPLICATIONS

This application is the U.S. National Phase application under 35 U.S.C. § 371 of International Application No. PCT/EP2020/079418, filed on Oct. 20, 2020, which claims the benefit of European Patent Application No. 19209571.9, filed on Nov. 15, 2019, and Chinese Patent Application PCT/CN2019/113078, filed on Oct. 24, 2019. These applications are hereby incorporated by reference herein.

FIELD OF THE INVENTION

The present invention relates to the field of LED drivers, and in particular to the field of LED drivers for LED lamps for retrofitting to a power source designed for a high-intensity discharge lamp.

BACKGROUND OF THE INVENTION

In the field of lighting, there has been a growing interest in LED lamps for replacing or retrofitting older lamps, and in particular high-intensity discharge (HID) lamps.

These retrofit LED lamps need to be appropriately designed so that they are able to draw power from a power source that was originally designed for powering an HID lamp. Whilst power is ultimately derived from a mains supply, i.e. a utility grid, a power source is any source to which an LED driver for an LED lamps may connect to draw power therefrom, e.g. and may comprise the mains supply, ballasts, compensation capacitors, ignitors and so on. The LED lamp and any components, such as a ballast and/or compensation capacitors, connecting the LED lamp to the mains supply form an LED lighting system.

Existing LED lamps typically comprise a diode bridge that couples to the power source to rectify an alternating current, which rectified output is stored by a (buffer) capacitor. This provides a DC (direct current) output for powering an LED load. Control over the power consumption of the LED lamp, e.g. to achieve a desired average power consumption, can be performed by periodically shunting some of the alternating current to a ground/reference voltage. Controlling the amount of the alternating current shunted allows the power provided to the LED load to be controlled, e.g. for dimming purposes.

However, shunting of the alternating current results in the overall LED lighting system having poor power characteristics, having an insufficient power factor and introducing harmonic distortion in the mains current. Shunting can also result in a greater voltage drop across elements of the power source so that they draw more current, this can result in overheating or thermal breakdown.

There is an ongoing desire to provide an LED driver for an LED lamp that overcomes at least some of these deficiencies.

SUMMARY OF THE INVENTION

The invention is defined by the claims.

According to examples in accordance with an aspect of the invention, there is provided an LED driver for generating an output power for driving an LED load from a power source adapted to provide an alternating input current. The proposed LED driver is particularly useful if the power source was originally adapted for powering an HID lamp.

The LED driver comprises: an input arrangement comprising a first terminal and a second terminal, for receiving an alternating input current from the power source; an output node for providing an output power for driving the LED load; a capacitor connected between the output node and a ground/reference voltage, wherein the capacitor is configured so that, when the LED driver is powered, a voltage across the capacitor is substantially constant; a switching arrangement adapted to controllably connect the first terminal to either the output node or the ground/reference voltage and the second terminal to either the output node or the ground/reference voltage to thereby enable control of a magnitude and phase, relative to a phase of the alternating input current, of the voltage between the first and second terminals; and a controller adapted to control the switching arrangement to thereby control the magnitude of voltage between the first and second terminals and the phase of the voltage between the first and second terminals relative to a phase of the alternating input current, so that energy transfer between the input arrangement and the output node is bi-directionally controllable to thereby control an average magnitude of the output power, wherein the controller is adapted to control the frequency of the voltage between the first and the second terminals to be equal to the frequency of the alternating input current.

Using a switching arrangement to control whether a first or second terminal is connected to the output node or the ground reference voltage enables control over the voltage between the first and second terminals. In particular, such a configuration allows power to be returned from the capacitor to the first or second terminal as well as power to be provided to the capacitor from the first or second terminals, i.e. enables bi-directional control over energy transfer between the input arrangement and the output node.

The ability to (temporarily) return power to the first or second terminals enables power factor improvements to the overall LED lighting system (i.e. the combination of the LED lamp and the power supply, excluding the mains supply) with respect to the mains supply. The invention thereby relies on the ability to allow current to flow to/from the first or second terminal to/from the output node.

The controller is able to define the phase between the voltage between the first and second terminals and the current provided to the input arrangement. This allows the controller to modify or define the power factor and other performance criteria (e.g. harmonic distortion) of the overall LED lighting system, to thereby improve at least the power factor. The phase can be adjusted so that the net amount of energy (per mains cycle) matches the desired output power level.

The controller may be adapted to control the phase of the voltage between the first and second terminals responsive to a control signal indicating a desired magnitude of light to be output by an LED load connectable to the output node. The inventors have recognized that the phase of the voltage between the first and second terminals can be modified to control the (average) power provided to a connected LED load, and therefore the (average) brightness of light output by the LED load.

The switching arrangement may comprise: a first switch directly connecting the first terminal to the output node; a second switch directly connecting the second terminal to the output node; a third switch directly connecting the first terminal to the ground/reference voltage; and a fourth switch directly connecting the second terminal to the ground/reference voltage.

Thus, in some embodiments, the switching arrangement does not comprise any inductive or capacitive elements, and is connected to directly receive the alternating input current from the input source (e.g. directly from a ballast of a power source). This provides a cheap and efficient LED driver for which control over dimming can be achieved (by adjusting the phase of the voltage between the first and second terminals) without affecting the power factor or other performance criteria of the overall LED lighting system.

The controller may be adapted to control the voltage between the first and second terminals by being operable in at least two modes, the at least two modes comprising at least:
  a first mode, in which the controller allows current to flow through the first switch and the fourth switch, and prevents current from flowing through the second switch and the third switch, so that the voltage between the first and second terminals is equal in magnitude and polarity to the voltage across the capacitor; and a second mode, in which the controller allows current to flow through the second switch and the third switch, and prevents current from flowing through the second switch and the fourth switch, so that the voltage between the first and second terminals is equal in magnitude but opposite in polarity to the voltage across the capacitor.

In other words, the controller may be adapted to control the voltage between the first and second terminals to effectively switch between a first value, which is effectively the voltage across the capacitor (i.e. between the output node and a ground/reference voltage), and a second, opposite value, having a same magnitude of the voltage across the capacitor but an opposite polarity.

The controller may be adapted to that the time that the controller operates in the first mode is substantially the same as the time that the controller operates in the second mode, per period of the alternating input current.

In the context of the present invention "substantially the same" means within practical limits or circumstances. Thus, there may be minor variations (e.g. ±1% or ±3%) between values that are considered to be substantially the same (e.g. the periods of time identified above), which may be due to inherent difficulties (e.g. in controlling timings), noise or other minor variations when practically implemented.

This ensures that the average power delivery from the power source to the LED load is equal for both polarities of the alternating input current, meaning that there is a consistent power draw from the input source (and ultimately the mains supply).

Preferably, the controller is further operable in a third mode, in which the controller controls the switching arrangement so that the first and second terminals are effectively short-circuited together.

This effectively enables the controller to control a duty-cycle of the voltage at the first terminal. The duty-cycle at the first terminal is the proportion of time, e.g. per period of the alternating input current, that charge is able to flow between the first terminal and the capacitor (i.e. when the voltage between the first terminal and a ground/reference voltage is held, by the switching arrangement, to be substantially equal to the voltage across the capacitor). This is effectively equal to the proportion of time, per period of the alternating input current, that the controller operates in the first mode.

This embodiment similarly enables the controller to control a duty-cycle of the voltage at the second terminal. The duty-cycle at the second terminal is the proportion of time, e.g. per period of the alternating input current, that charge is able to flow between the second terminal and the capacitor (i.e. when the voltage between the second terminal and a ground/reference voltage is held, by the switching arrangement, to be substantially equal to the voltage across the capacitor). This is effectively equal to the proportion of time, per period of the alternating input current, that the controller operates in the second mode.

In embodiments where the third mode comprises connecting the first or second terminals to a ground/reference voltage, the duty-cycle at the first or second terminal is the duty-cycle of the voltage between the first or second terminal and the ground/reference voltage. These duty-cycles therefore effectively represent the proportion of time that the voltage between the first or second terminal and a ground/reference voltage is at a predetermined non-zero value (e.g. the proportion of time that the voltage between the first or second terminal and a ground/reference voltage is held to be equal in magnitude and polarity to the voltage across the capacitor).

For the sake of clarity, the proportion of time that the voltage between the first terminal and the second terminal is non-zero is equal to the sum of the two described duty-cycles. Thus, where the two duty-cycles are equal, a duty-cycle at a first or second terminal can be calculated by halving the amount of time, per period of the alternating input current, that the voltage between the first and second terminals is non-zero.

The duty-cycle of the voltage between the first and second terminals is equal to the duty cycle of the voltage at the first terminal and the duty cycle of the voltage at the second terminal. Thus, the duty-cycle of the voltage between the first and second terminals is the proportion of time, per period of the alternating input current, that the voltage between the first and second terminals is non-zero.

The inventors have recognized that controlling the duty-cycle of the voltage at the first and/or second terminal enables the controller to adjust/steer the harmonic content of the voltage between the first and second terminals (and therefore the harmonic content of the alternating input current and, ultimately, the mains supply).

To operate in the third mode, the controller may be configured to allow current to flow through the first switch and the second switch and/or allow current to flow through the third switch and the fourth switch.

The controller may be adapted to that the cumulative time that the controller operates in the first or second mode is between 1 and 9 times the cumulative time that the controller operates in the third mode, and preferably between 2.8 and 3.6 times the cumulative time that the controller operates in the third mode.

These durations control the voltage between the first terminal and a ground/reference voltage and the second terminal and a ground/reference voltage to have an optimal duty-cycle that provides particularly effective reductions in the harmonic content of the voltage between the first and second terminals. In particular, it has been identified that such durations enable a LED lighting system to meet international standards, such as the IEC 61000-3-2.

The controller may be adapted to iteratively perform a sequence of: for a first period of time, operating in the first mode; for a second, subsequent period of time, operating in the third mode; for a third, subsequent period of time, operating in the second mode; and for a fourth, subsequent period of time, operating in the third mode.

This control method reduces extremely large step changes in the voltage between the first and second terminals, reducing an amount of audible noise that is potentially caused by such step changes.

Preferably, the duration of the second period of time and the fourth period of time is substantially the same. Preferably, the duration of the first and third period of time is substantially the same. This helps ensure that the voltage between the first and second terminals is symmetric, thereby reducing its harmonic content.

It is re-emphasized that, in the context of the present invention, "substantially" means within practical limits or circumstances. Thus, there may be minor variations (e.g. ±1% or ±3%) between the periods of time listed above, e.g. due to inherent difficulties in controlling timings.

The controller is adapted to: operate in the first mode for at least a portion of the time during which the current flow from the alternating input current to the first terminal is positive; and operate in the second mode for at least a portion of the time during which the current flow from the alternating input current to the first terminal is negative. This helps ensure that at least some charge flows from the power source to the capacitor (and ultimately the LED load).

Preferably, the length of time during which the controller operates in the first mode is at least half the time during which the current flow from the alternating input current to the first terminal is positive. Preferably, the length of time during which the controller operates in the second mode is at least half the time during which the current flow from the alternating input current to the first terminal is negative. This restriction helps maintain the charge flow from the alternating input current to the LED load, to ensure that the LED load is powered. Thus, more charge/energy moves from the power source to the output node, than vice versa, over the course of a cycle of the mains supply.

In some embodiments, the switching arrangement comprises: a first inductive element connecting the first terminal to a first intermediate node; a first switch connecting the first intermediate node to the output node; a second switch connecting the second terminal to the output node; a third switch connecting the first intermediate node to the ground/reference voltage; and a fourth switch connecting the second terminal to the ground/reference voltage.

The controller may be adapted to: control the first and third switches so that the first switch prevents current flow when the third switch permits current flow, and vice versa; control the second and fourth switches so that the second switch prevents current flow when the fourth switch permits current flow, and vice versa; controllably switch the second and fourth switches between preventing current flow and permitting current flow at the frequency of the alternating input current; and controllably switch the first and third switches between preventing current flow and permitting current flow, at a frequency higher than the frequency of the alternating input current, according to a pulse width modulation scheme to control the magnitude of the voltage between the first and second terminals.

In some embodiments, the switching arrangement may comprise: a first inductive element connecting the first terminal to a first intermediate node; a second inductive element connecting the second terminal to a second intermediate node; a first switch connecting the first intermediate node to the output node; a second switch connecting the second intermediate node to the output node; a third switch connecting the first intermediate node to the ground/reference voltage; and a fourth switch connecting the second intermediate node to the ground/reference voltage.

Of course, the controller may be adapted to: control the first and third switches so that the first switch prevents current flow when the third switch permits current flow, and vice versa; control the second and fourth switches so that the second switch prevents current flow when the fourth switch permits current flow, and vice versa; controllably switch the second and fourth switches between preventing current flow and permitting current flow at the frequency higher than the frequency of the alternating input current and controllably switch the first and third switches between preventing current flow and permitting current flow, at a frequency higher than the frequency of the alternating input current, according to a pulse width modulation scheme to control the magnitude of the voltage between the first and second terminals.

According to examples in accordance with an aspect of the invention, there is provided an LED lamp comprising: any herein described embodiments of the LED driver; and an LED load connected to the output node (of the LED driver).

According to examples in accordance with an aspect of the invention, there is provided an LED lighting system comprising the LED lamp and an electromagnetic ballast adapted to connect to a mains supply to provide an alternating input current to the input arrangement of the LED driver.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an LED driver for an LED lamp, which also comprises an LED load. The LED driver is adapted to connect to an input source at a first and second terminal. The LED driver comprises a switching arrangement configured to enable a controller to control at least a magnitude and phase of the voltage between the first and second terminals. The phase of the voltage between the first and second terminals may be defined to control an amount of power that flows from the input source to power the LED lamp.

Embodiments of the invention may be employed in LED lamps for replacing existing HID lamps to form LED lighting systems.

Figure 1:
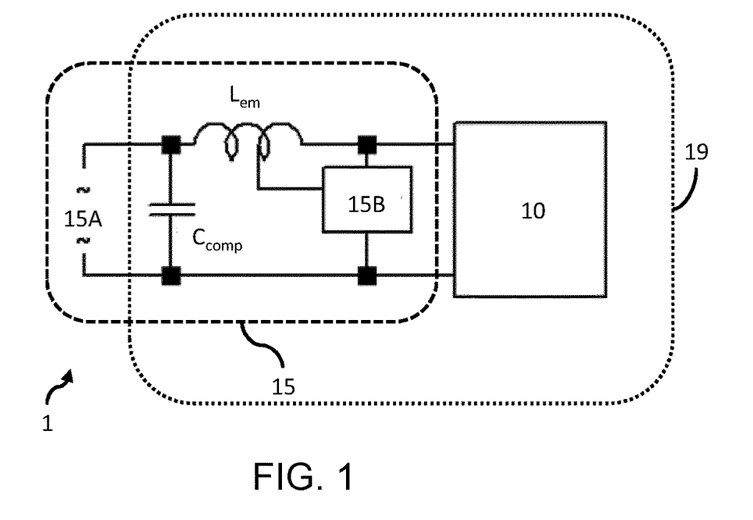
FIG. 1 illustrates an LED lighting system.

FIG. 1 illustrates a LED system 1 comprising an LED lamp 10 and a power source 15, the configuration of which is common in the prior art.

The power source 15 comprises a main power supply 15A. Moreover, the power source 15 was originally designed for powering an HID lamp, and comprises a number of further elements designed for use with such HID lamps. These elements include at least an EM ballast $L_{em}$, and may include a compensation capacitor $C_{comp}$ and an ignitor 15B. Different types of ignitors may be used, such as a parallel, semi-parallel and/or series ignitor.

The LED lamp 10 and the elements of the power source 15 (excluding the mains supply 15A itself) together form an LED lighting system 19. When assessing power characteristics in the content of the present invention, it is the power characteristics of the LED lighting system 19 with respect to the mains supply 15A that are considered.

The LED lamp 10 is adapted to draw power from the power source 15. When at least the element $L_{em}$, and optionally the further elements $C_{comp}$ and 15B are present, the LED lamp 10 should contain a driver adapted to appropriately drive an LED string.

The power source 15 provides an alternating input current $I_{em}$ for the LED lamp 10. The frequency of the alternating input current $I_{em}$ is identical to that provided by the mains power supply 15A. Harmonic distortion in the alternating input current (e.g. caused by the LED lamp 10) results in undesirable harmonic distortion in the mains supply.

The present invention relates to new embodiments for the LED lamp 10, and in particular to new drivers for an LED lamp. An example of a known LED lamp 10 shall be briefly described for comparative purposes.

Figure 2:
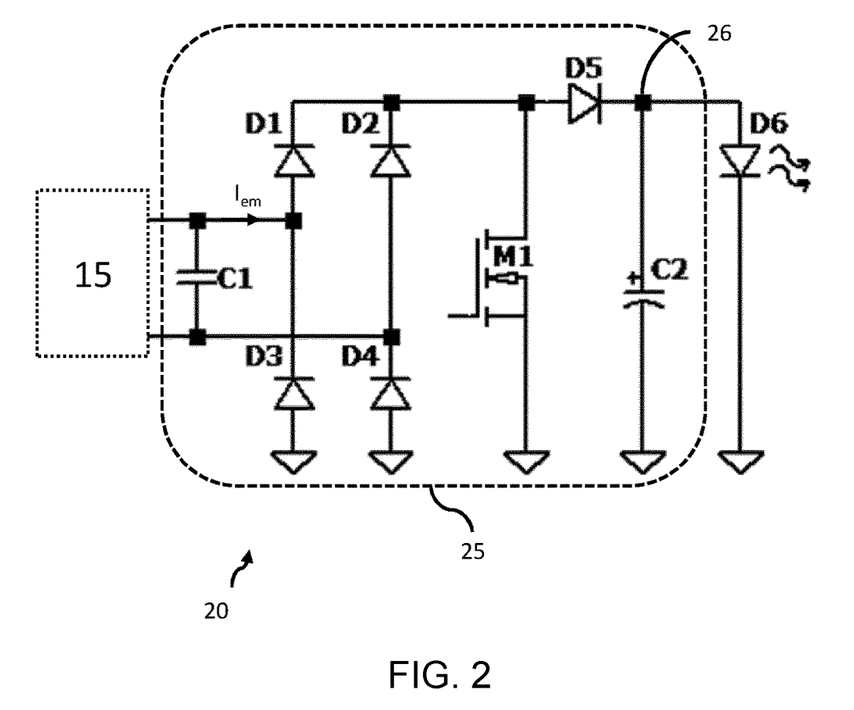
FIG. 2 illustrates an LED lamp having an LED driver according to known examples.

FIG. 2 illustrates an LED lamp 20 according to known examples. The LED lamp 20 is adapted for use with the power source 15 comprising the further elements $L_{em}$, $C_{comp}$, 15B— which capability is commonly referred to as "Type A".

The LED lamp 20, together with some components of the power source, forms the overall LED lighting system.

The LED lamp 20 comprises an LED driver 25 and an LED load D6, driven by the LED driver 25. The LED driver 25 comprises a diode bridge D1, D2, D3, D4, a shunt switch M1, a buffer capacitor C2 and a rectifying diode D5.

The diode bridge D1, D2, D3, D4 rectifies the (differential) input provided by the power source 15. This rectified input is provided to the buffer capacitor C2 via the rectifying diode D5. The buffer capacitor stores charge for powering the LED load D6 via an output node 26. In the illustrated example, the voltage across the buffer capacitor is effectively equal to the forward voltage of the LED load (discounting any voltage lost to wire resistances or the like).

In this way, the LED driver 25 provides a substantially DC voltage for powering the LED load D6, thereby acting as an AC-DC converter.

In some examples (not illustrated) the output node 26 may be connected to the LED load D6 via one or more additional circuit components, such as a switched mode power supply (which would enable the voltage at the output node 26 to be decoupled/independent from the voltage across the LED load D6).

The shunt switch M1 allows for control over the average amount of charge delivered to output node 26, and thereby the brightness of the LED load D6. The shunt switch M1 is controlled to couple the output of the diode bridge D1, D2, D3, D4 to ground for a portion of the half-cycle of the alternating input current provided by the power source. This allows the current (provided by the power source) to continually flow, but part of the time prevent that current from flowing to the buffer capacitor C2 and the LED load. By adjusting the duration during which the shunt switch performs shunting during each half-cycle, the average charge delivered to output node 26, and therefore average current through the LED load, can be controlled to achieve a desired brightness (e.g. for dimming purposes).

To prevent activation of the shunt switch M1 from discharging the buffer capacitor C2 to ground, a blocking diode D5 is connected between the shunt switch and the buffer capacitor C2.

The LED lamp further comprises a coupling capacitor C1 to reduce electromagnetic interference noise. It also serves to limit the time-derivative of the voltage across the capacitor, which, if too high, may cause audible noise in the (windings of the) EM ballast.

The above described driver is effective for controlling the LED brightness to be at the desired level, but can result (especially at low dimming levels) in a mains power factor substantially below 0.9 and substantial harmonic distortion in the mains current that does not meet requirements (especially at the reduced 1st harmonic amplitude, corresponding to the lower power consumption).

Moreover, at low dimming levels (i.e. when a large proportion of the alternating input current is shunted), the current through the ballast $L_{em}$ of the power source increases (as overall impedance decreases), which may lead to the ballast becoming overheated or at least power loss in the EM ballast.

It is desirable for LED lamps, when operating, to consume less energy per unit time than the HID lamp that they are replacing. When a diode bridge D1, D2, D3, D4 is used in an LED lamp, it may therefore be necessary to use an LED load having a very low forward voltage (i.e. a low voltage on the output node) in order to achieve the desirable low power consumption. However, at such low LED forward, and therefore buffer capacitor C2, voltages, the voltage across the EM ballast, and therefore current through, the EM ballast $L_{e}m$ would be higher than during HID operation, causing increased power loss in the EM ballast and potentially overheating of the EM ballast. On the other hand, using a higher LED forward (and C2) voltage would require a lower average current through the LED load to achieve the desired energy savings, meaning that a significant portion of the alternating input current provided to the LED lamp will need to be shunted to achieve the lower average LED load current, which negatively affects the power characteristics of the overall LED lighting system.

The present invention relates to a new type of LED lamp, and in particular, to a new driver for an LED lamp that mitigates at least some of these problems.

Figure 3:
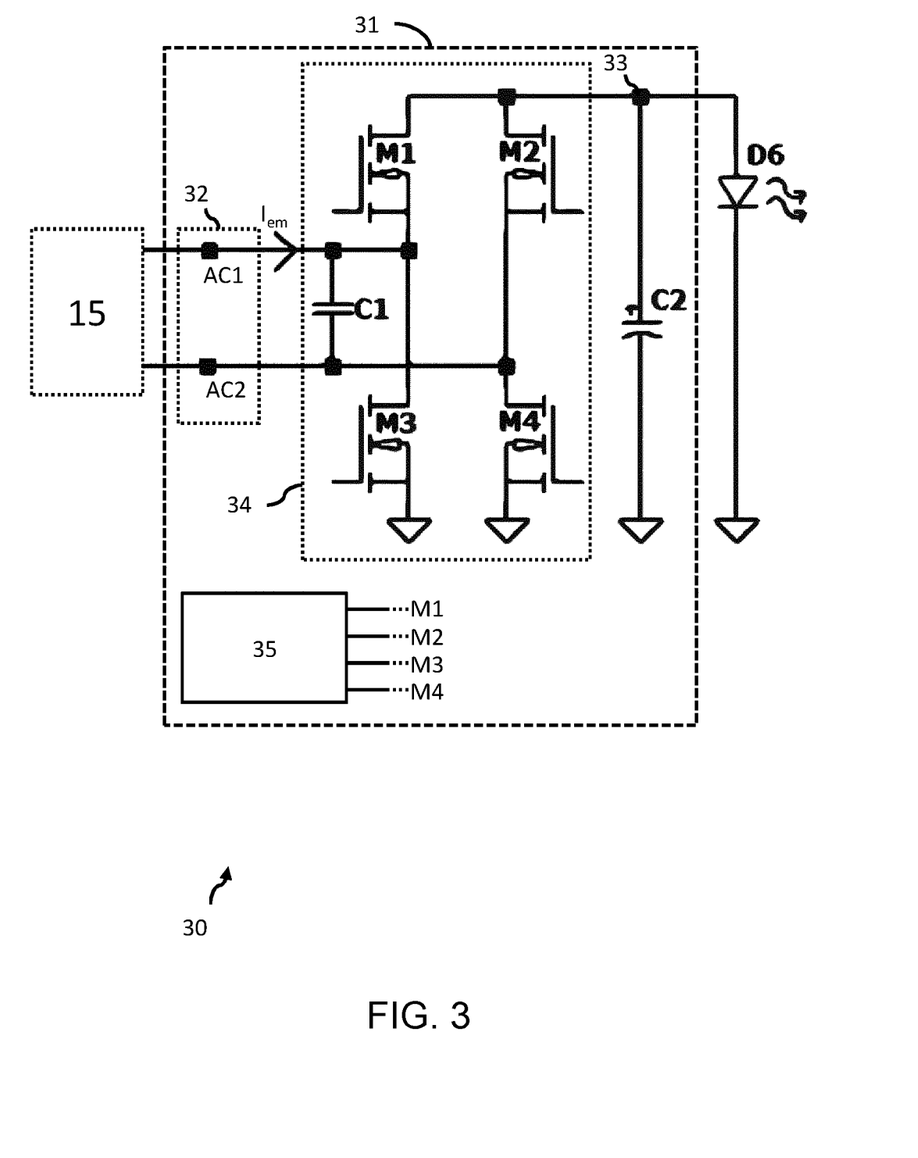
FIG. 3 illustrates an LED lamp having an LED driver according to an embodiment of the invention.

FIG. 3 illustrates an LED lamp 30 comprising an LED load D6 and an LED driver 31 according to an embodiment of the invention. The LED lamp 30 may be used to replace the LED lamp 10 illustrated in FIGS. 1 and 2.

The LED driver 31 comprises an input arrangement 32, an output node 33, a switching arrangement 34 and a controller 35. A (buffer) capacitor C2 connects the output node 33 to a ground/reference voltage. The LED load D6, of the LED lamp 30, is powered by the output node 33.

The input arrangement 32 comprises a first terminal AC1 and a second terminal AC2, and receives an alternating input current $I_{em}$ from a power source (e.g. the power source illustrated in FIG. 1).

The value of the alternating input current $I_{em}$ is here measured at the first terminal AC1, where positive current flow moves towards the remainder of the LED driver and negative current flow moves away from the remainder of the LED driver. There is, of course, a corresponding current present at the second terminal AC2, which is opposite in polarity to the measurement of the alternating input current $I_{em}$.

For the sake of convenience, any herein described LED driver can be conceptually divisible into an "AC-side" and a "DC-side". The AC-side is the portion of the LED driver between the power source (when connected to the power source) and the switching arrangement. The DC-side is the portion of the LED driver between the switching arrangement and the LED load (when connected to the LED load).

The illustrated switching arrangement 34 comprises a first switch M1 directly connecting the first terminal to the output node; a second switch M2 directly connecting the second terminal to the output node; a third switch M3 directly connecting the first terminal to the ground/reference voltage; and a fourth switch M4 directly connecting the second terminal to the ground/reference voltage.

The switching arrangement may further comprise a coupling capacitor C1 to reduce (electromagnetic interference) noise between the first and second terminals. It also serves to limit the time-derivative of the voltage between the first and second terminals, which, if too high, may cause audible noise in the (windings of the) EM ballast.

The first, second, third and fourth switches may comprise a transistor, such as a BJT, JFET or MOSFET. In the context of the present invention, the term "switch" refers to any component that can be controlled to selectively permit or prevent charge from flowing between two nodes. The skilled person would be readily capable of adapting any such transistors for such purposes, for example, by including an anti-parallel diode for a BJT.

The controller 35 is adapted to control an operation of the switches M1-M4 of the switching arrangement, e.g. by controlling a gate/base voltage of a transistor, which is commonly referred to as the control electrode of the switch. Other methods of controlling a switch will be apparent to the skilled person.

The illustrated switching arrangement provides, with appropriate control of the switches M1-M4, 4-quadrant operation of the power at the input arrangement. 4-quadrant operation means that the phase of the voltage between the first AC1 and second terminals AC2 (measured from AC1 to AC2) can be controlled relative to the alternating input current $I_{em}$.

Effectively, 4-quadrant operation means that when the voltage between the first and second terminals is positive, the input current may be negative or positive (not simultaneously), and conversely, when the voltage between the first and second terminals is negative, the input current may be positive and negative.

In other words, the switching arrangement is able to operate in four different states of current flow.

A first state exists when the alternating input current $I_{em}$ is positive and the voltage between the first AC1 and second AC2 terminals is positive (i.e. V(AC1)>V(AC2)). This is achieved by (when the alternating input current is positive) making the first and fourth switches M1 and M4 conductive (and preventing the second and third switches from being conductive) so that charge flows (i.e. power is transferred) from the AC-side of the LED driver to the DC-side of the driver. Thus, current flows from the first terminal AC1 to the output node. This can also be called a "power deliver" phase whilst the AC1, AC2 voltage is positive, and the current is positive. This may be called "first quadrant" operation.

A second state exists when the alternating input current is positive $I_{em}$ and the voltage between the first AC1 and second AC2 terminals is negative. This is achieved by making the second and third switches M2 and M3 conductive (and preventing the first and fourth switches from being conductive) so that the voltage between the first and second terminals is forced to be negative. In particular, we return power from the buffer capacitor C2 to the AC-side of the switching arrangement 33 to keep the voltage between AC1 and AC2 negative. Thus, current flows from the output node to the second terminal AC2. This can also be called a "power return" phase whilst the AC1, AC2 voltage is negative, and the current is positive. This may be called "second quadrant" operation.

A third state exists when the alternating input current $I_{em}$ is negative and the voltage between the first AC1 and second AC2 terminals is negative (i.e. V(AC1)<V(AC2)). This is achieved by (when the alternating input current is negative) making the second and third switches M2 and M3 conductive (and preventing the first and fourth switches from being conductive) so that charge flows from the AC-side of the LED driver to the DC-side of the driver. Thus, current flows from the second terminal AC2 to the output node. This can also be called a "power deliver" phase whilst the AC1, AC2 voltage is negative while the current is negative. This may be called "third quadrant" operation.

A fourth state exists when the alternating input current $I_{em}$ is negative and the voltage between the first AC1 and second AC2 terminals is positive. This is achieved by making the first and fourth switches M1 and M4 conductive (and preventing the second and third switches from being conductive) so that the voltage between the first and second terminals is forced to be positive. In particular, we return power from the buffer capacitor C2 to the AC-side of the switching arrangement 33 to keep the voltage between AC1 and AC2 positive. Thus, current flows from the output node to the first terminal AC1. This can also be called a "power return" phase whilst the AC1, AC2 voltage is positive while the current is negative. This may be called "fourth quadrant" operation.

In this first and fourth states (for the circuit illustrated in FIG. 3), the voltage between the first AC1 and second AC2 terminals is held to be substantially equal in magnitude and polarity to the voltage across the (buffer) capacitor C2. This voltage is configured to be substantially constant, e.g. equal to the forward voltage of a connected LED load, barring some minor discharging of the capacitor.

In the second and third states (for the circuit illustrated in FIG. 3), the voltage between the first AC1 and second AC2 terminals is held to be equal in magnitude, but opposite in polarity, to the voltage across the (buffer) capacitor C2. This is configured to be substantially constant, e.g. equal to the forward voltage of a directly connected LED load, barring some minor discharging of the capacitor.

It has been described how, in the first through fourth states, the magnitude of voltage between the first and second terminals may be effectively/substantially identical to the voltage across the (buffer) capacitor. In this context "substantially identical" means effectively identical given practical circumstances and implementation requirements (i.e. non-ideal nature of components). Thus, the magnitude of the voltages may be identical, excepting for any voltage drop across circuit elements positioned between the terminals and the capacitor (such as a voltage drop across the switches M1-M4), any introduction of noise (e.g. EMI noise) or the like. In some circumstances, this magnitude of the voltage between the first and second terminals may be the same as the voltage across the capacitor, ±1% or ±3%.

Thus, 4-quadrant operation is enabled, and the net amount of power (energy per mains half-cycle) can be controlled by adjusting the balance between the (DC-to-AC side) retuned power and the (AC-to-DC side) delivered power, by adjusting the switching moments of the switches M1-M4.

In this way, 4-quadrant operation enables the controller to control a magnitude and phase of the voltage between the first AC1 and second AC2 terminals (by selectively allowing charge stored by the (buffer) capacitor C2 to flow back to these terminals). This enables control over the power supplied to the LED load D6 without needing to shunt power to a ground/reference voltage, improving power factor and reducing an amount of current made to flow through the power source (which may overheat a ballast of the power source).

One option for appropriately controlling the switching arrangement to control the power provided to the DC-side by the AC-side could be to adapt the controller to switch between two modes: a first mode, in which the controller allows current to flow through the first switch and the fourth switch, and prevents current from flowing through the second switch and the third switch, so that the voltage between the first and second terminals is equal in magnitude and polarity to the voltage across the capacitor; and a second mode, in which the controller allows current to flow through the second switch and the third switch, and prevents current from flowing through the second switch and the fourth switch, so that the voltage between the first and second terminals is equal in magnitude but opposite in polarity to the voltage across the capacitor.

When the controller operates in the first mode, the switching arrangement operates in the fourth and/or first states. Thus, the voltage between the first and second terminals is held to be substantially equal in magnitude and polarity to the (substantially constant) voltage across the capacitor.

When the controller operates in the second mode, the switching arrangement operates in the second and/or third states. Thus, the voltage between the first and second terminals is held to be substantially equal in magnitude, but opposite in polarity, to the (substantially constant) voltage across the capacitor.

Thus, switching the controller between the first and second modes effectively results in the generation of a square wave voltage between the first and second terminals, having an amplitude essentially equal to the voltage across the (buffer) capacitor C2 and hence, in the illustrated example, the LED load D6 forward voltage.

This square wave should have a frequency equal to the mains frequency, and a phase that is adjusted to balance the amount of returned and delivered energy per mains half cycle to match the desired amount of energy per mains half-cycle that is to be delivered to the LED load.

Thus, control of the phase of the voltage between the first and second terminals allows control over the power provided to the LED load, and thereby the brightness of light output by the LED load.

For example, if the phase of the voltage between the first and second terminals is equal to the phase of the alternating input current, then current continually flows from the AC-side of the LED driver to the DC-side of the LED driver, (and the average current through the LED load is at a maximum. This results in the LED load outputting light of a maximum brightness.

If there is a phase difference between the alternating input current and the voltage between the first and second terminals, then the average amount of power delivered to the DC side is reduced (as the DC-side will periodically deliver power back to the AC-side). Thus, the amount of power available for powering the LED load is reduced (compared to the in-phase example), reducing the brightness of light output by the LED load.

Forming the voltage between the first and second terminals (i.e. the AC1, AC2 voltage) as a square wave and adjusting the phase of the square wave with respect to the EM ballast current $I_{em}$ allows us to achieve a substantially improved power factor at a suitably selected string voltage and allows us to control (average) LED current, provided that the conduction of each switch pair M1, M4 and M2, M3 starts by returning power (i.e. current flow from the DC-side to the AC-side) and ends with receiving power (i.e. current flows from the AC-side to the DC-side).

This effectively results in the voltage between the first and second terminals leading the alternating input current from the power source. Having this voltage lead the alternating input current $I_{em}$ results in the LED lamp appearing to have a partial inductive impedance. This is effectively added to the EM ballast inductance, thus reducing the EM ballast current and lamp current and reducing EM ballast losses.

If the voltage between the first and second terminals lags the alternating input current, then the LED lamps has a partially capacitive behavior. As the LED lamp is in series with the inductance of the EM ballast, this capacitive behavior of the LED lamp would effectively subtract from the inductive impedance of the EM ballast, rendering a higher current in the EM ballast and hence more losses.

Thus, to improve the power factor of the overall LED lighting system, the controller should control the phase of the voltage between the first and second terminals so that it leads the alternating input current. This can be performed through appropriate timings of switching between the first/second modes.

Referring to the possible states of switching arrangement (previously described), the switching arrangement may therefore move from the fourth state, to the first state, to the second state to the third state. This process should be iteratively repeated.

However, simulations have shown that forming the voltage between the first and second terminals as a square wave can still result in the overall LED lamp having undesirable levels of THD (total harmonic distortion) and individual harmonics on the mains supply (which eventually powers the LED lamp). It has been recognized that this THD must be caused by the harmonic content of the square-wave voltage between the first and second terminals, as it is effectively the only source of harmonic distortion in the system.

A full square wave voltage contains substantial harmonics; e.g. the 3rd harmonic is then 33% ($1/3$) of the first harmonic, the 5th harmonic 20% ($1/5$), the 7th harmonic 14% ($1/7$), et cetera.

It has been recognized that the harmonic content of a square-wave signal depends on the duty-cycle of that square-wave. By adjusting the duty-cycle of the voltage (between the first and second terminals), it is therefore possible able to adjust or steer the harmonic content of the square-wave voltage and thus the EM ballast and mains current.

The switching arrangement 33 offers the option to shunt or short the first AC1 and second AC2 terminals. This can be achieved by simultaneously causing either both M1 and M2 to be conductive or both M3 and M4 to be conductive. Preferably, for reasons of easy gate-drive, a shunting-phase is achieved by simultaneously causing the third and fourth switch to be conductive.

The voltage between the first AC1 and second AC2 terminals is effectively/substantially zero when the first and second terminals are shorted together.

Thus, by proper gate drive operation, the switching arrangement is capable of 4-quadrant operation and a shunting-phase, and thus is able to synthesize a duty-cycle limited voltage between the first and second terminals.

The controller may therefore be operable in a third mode, in which the controller controls the switching arrangement so that the first and second terminals are effectively short-circuited together.

Preferably, the controller is adapted to iteratively perform a sequence of: for a first period of time, operating in the first mode; for a second, subsequent period of time, operating in the third mode; for a third, subsequent period of time, operating in the second mode; and for a fourth, subsequent period of time, operating in the third mode.

This effectively results in the switching arrangement moving from operating in the fourth/first state, to operating in a shunting phase, to operate in the second/third state, to operating in the shunting phase.

Referring to the possible states of switching arrangement (previously described), to ensure that the voltage between the first and second terminals leads the alternating input current (thereby improve power characteristics of the overall LED lighting system), the switching arrangement may be controlled to sequentially operate in the fourth state, then the first state, then a shunting phase, then the second state, then the third state and then another shunting phase. This process is iteratively repeated.

In other words, the switching arrangement will sequentially move between a power return and then deliver phase via M1 and M4 with the AC1, AC2 voltage being positive, a first, shunting phase via M3 and M4, a power return and then deliver phase via M2 and M4 with the AC1,AC2 voltage being negative and a second shunting phase via M3 and M4.

Preferably, the combined duration of the first and second period is equal to the combined duration of the third and fourth period. Preferably, the duration of the first and third period is substantially the same. Preferably, the duration of the second and fourth period is substantially the same. Meeting all of these preferences will result in a symmetrical signal, leading to reduced harmonics.

Figure 4:
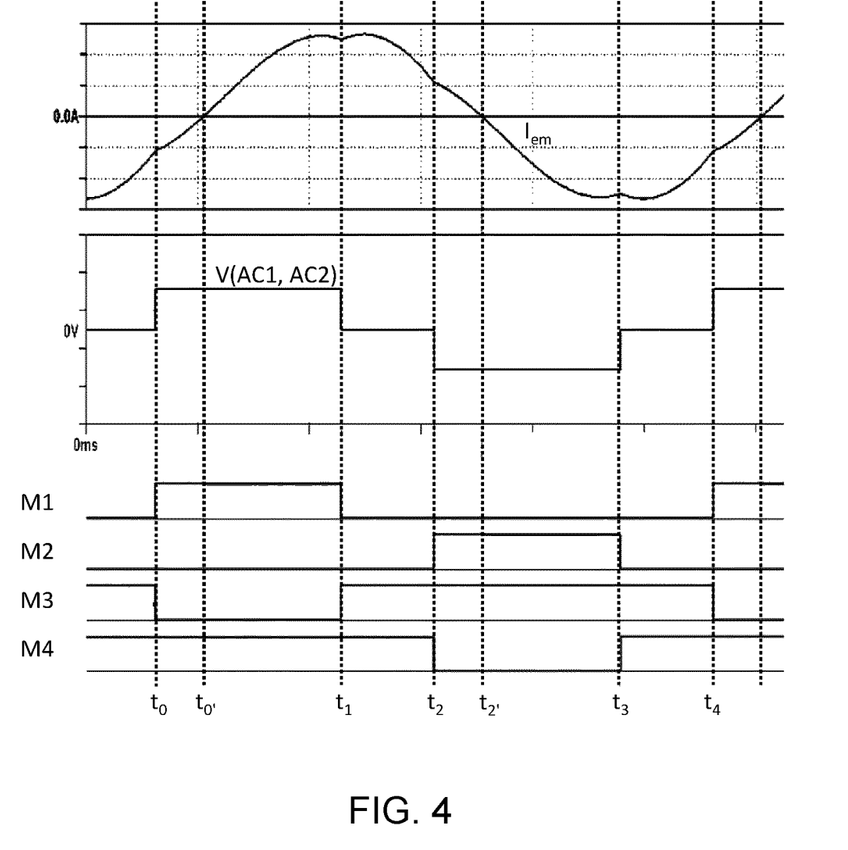
FIG. 4 illustrates control signals for an LED driver according to an embodiment of the invention.

This preferred control sequence is illustrated in FIG. 4, which demonstrates a cycle of the control sequence and the effect on the voltage V(AC1, AC2) between the first and second terminals. For comparison purposes, an illustration of an alternating input current is also provided.

The illustrated control signals M1-M4 indicate a control of a voltage at the gate of the respective switches M1-M4 (i.e. gate drive signals). Methods of controlling a switch in this manner are well known to the skilled person.

For the two "high-side" switches (M1, M2), the gate drive signals are both with respect to the source of the switch (here: the first terminal and the second terminal respectively). The switching arrangement may therefore comprise level shifters to level-shift the gate drive signals from the ground/reference to the respective sources. Such control methods would be known to the skilled person.

For the two "low-side" switches (M3, M4) the gate drive signals are both with respect to the ground/reference voltage.

Initially, between a time $t_0$ and a time $t_1$, the controller operates in the first mode. The voltage V(AC1, AC2) is thereby held at a constant, positive voltage level (being the voltage across the capacitor, which may be effectively equal to the forward voltage of an LED string directly connected to the capacitor). When the alternating input current is negative, i.e. between times $t_0$ and $t_0$ current flows from the capacitor to the first terminal, to maintain the voltage V(AC1, AC2) at the positive voltage level. Thus, between times $t_0$ and $t_0$, charge flows from the DC-side to the AC-side of the LED driver. When the alternating input current is positive, i.e. between times $t_0$ and $t_1$, current flows from the first terminal to the capacitor. The voltage V(AC1, AC2) is maintained at the positive voltage level by the buffering effect of C2. Thus, between times to' and $t_1$, charge flows from the AC-side to the DC-side of the LED driver.

Between a time $t_1$ and a time $t_2$, the controller then operates in the third mode. Thus, the voltage V(AC1, AC2) is held to zero, as the first and second terminals are effectively short-circuited.

Between a time $t_2$ and a time $t_3$, the controller operates in the second mode. The voltage V(AC1, AC2) is thereby held at a constant, negative voltage level (being a voltage equal in magnitude to the voltage across the capacitor, which may be effectively equal to the forward voltage of an LED string directly connected to the capacitor, but opposite in polarity). When the alternating input current is positive, i.e. between times $t_2$ and $t_2$', current flows from the capacitor to the second terminal, to maintain the voltage V(AC1, AC2) at the negative voltage level. This is because the current at the second terminal is opposite in polarity to the alternating input current provided at the first terminal. Thus, between times $t_2$ and $t_2$', charge flows from the DC-side to the AC-side of the LED driver. When the alternating input current is negative, i.e. between times $t_2$ and $t_3$, current flows from the second terminal to the capacitor. The voltage V(AC1, AC2) is maintained at the negative voltage level by the buffering effect of C2. Thus, between times $t_2$ and $t_3$, charge flows from the AC-side to the DC-side of the LED driver.

Between a time $t_3$ and a time $t_4$, the controller then operates in the third mode. Thus, the voltage V(AC1, AC2) is held to zero, as the first and second terminals are effectively short-circuited.

As can be seen from FIG. 4, the proposed control method enables the magnitude of the voltage between the first and second terminals to be switched between effectively three voltage levels (barring any minor variations due to capacitor discharge or voltage drop across the switches M1-M4). This permits control over the phase of the voltage between the first and second terminals, as well as control over the duty-cycle of the voltage at the first terminal and the duty-cycle of the voltage at the second terminal. A precise explanation of the term "duty-cycle" has been previously described. A phase difference between the voltage between the first and second terminals and the alternating input current can therefore be achieved (as illustrated).

It may be important to select an appropriate duty-cycle to achieve a desired level of THD (i.e. THD below a predetermined value) and/or individual harmonics (e.g. an individual harmonic percentage below a predefined limit). In particular, a duty-cycle may be selected to enable the LED driver to meet certain predetermined performance standards whilst still enabling the delivery of a certain amount of power to the LED load.

The duration of the first period of time is controlled to be equal to the duration of the third period of time. Thus, the duty-cycle of the voltage at the first terminal AC1 (e.g. with reference to a ground/reference voltage/node) is substantially the same as the duty-cycle of the voltage at the second terminal AC2 (e.g. with reference to the ground/reference voltage/node).

The duty-cycle defines the duration of the first/third period of time with respect to the other periods of time. Thus, the duty-cycle defines the length of time during one cycle at which the voltage between the first and second terminals is at a predetermined non-zero voltage, i.e. the proportion of time that the voltage is at the voltage level of the buffer capacitor or of opposite polarity, but equal magnitude, to the voltage level of the buffer capacitor.

The duty-cycle could be calculated by dividing the duration of the first period by the sum of the duration of the first, second, third and fourth period. In another example, the duty-cycle could be calculated by dividing the duration of the third period of the sum of the duration of the first, second, third and fourth period.

It is also noted that the performance characteristics of an LED driver are dependent upon the voltage across the (buffer) capacitor. There may therefore be a need to select and/or control the voltage cross the buffer capacitor in order to optimize performance of the overall LED lamp.

Figure 5:
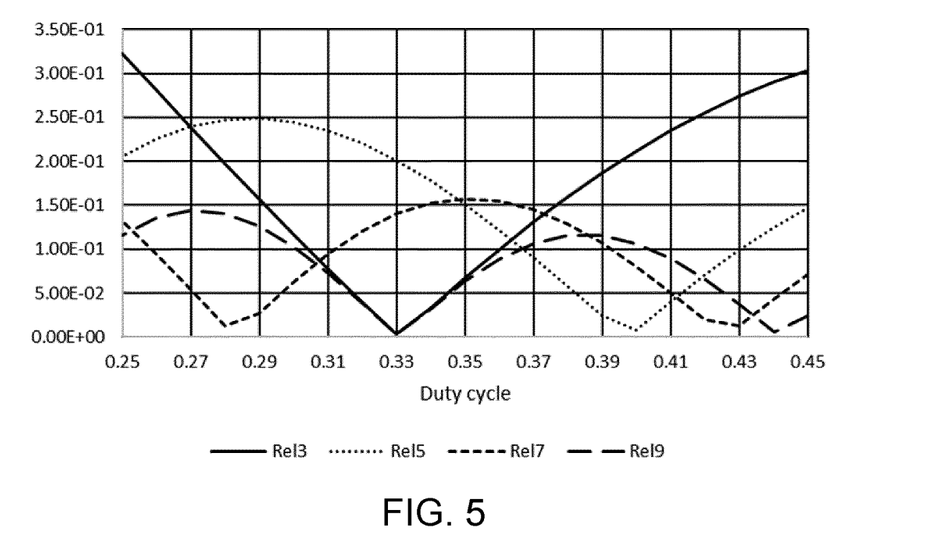
FIGS. 5 to 7 illustrate some simulation results for an arbitrary version of the LED lamp illustrated in FIG. 3.
Figure 6:
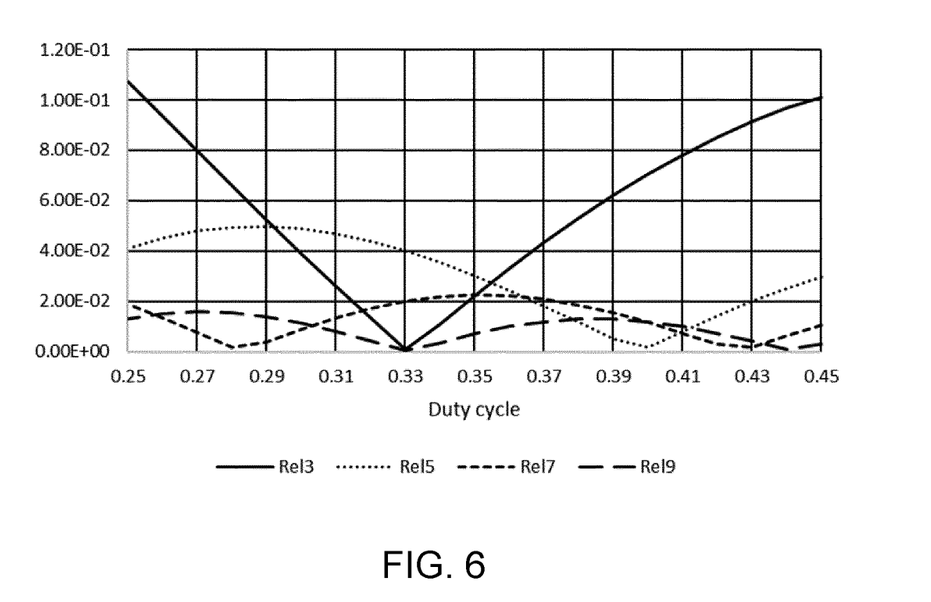
Figure 7:
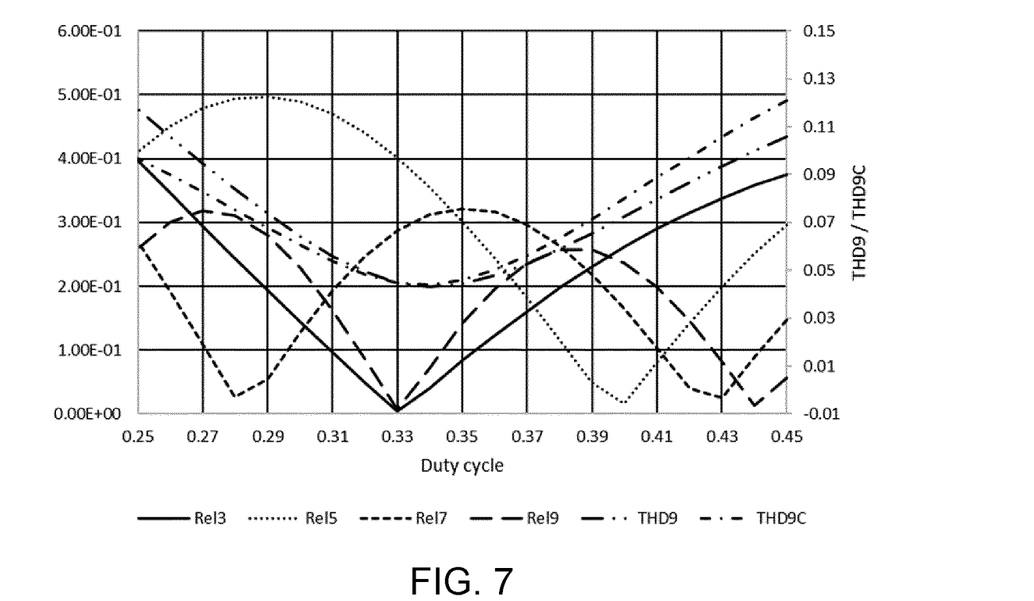

FIGS. 5 to 7 illustrate some simulation results for an arbitrary version of the circuit illustrated in FIG. 3 for aiding in appropriate selection of a duty-cycle. Here, the duty-cycle refers to a duty-cycle of the first terminal, being a proportion of time that the charge is permitted to flow between the first terminal and the buffer capacitor. The duty-cycle of the second terminal is assumed to be substantially identical to the duty-cycle of the first terminal.

FIG. 5 illustrates the magnitude of the $3^{rd}$, $5^{th}$, $7^{th}$ and $9^{th}$ harmonics in the voltage, normalized to the $1^{st}$ harmonic, for the voltage between the first and second terminals, caused by the controlling of the voltage between the first and second terminals according to the above-described scheme. The magnitude of each harmonic is illustrated using a different dash-dot combination, as indicated in FIG. 5.

FIG. 6 illustrates the magnitude of the 3rd, $5^{th}$, $7^{th}$ and $9^{th}$ harmonics in the alternating input current, normalized to the $1^{st}$ harmonic, caused by the controlling of the voltage between the first and second terminals according to the above-described scheme. The magnitude of each harmonic is illustrated using a different dash-dot combination, as indicated in FIG. 6.

FIG. 7 illustrates the magnitude of the 3rd, 5th, $7^{th}$ and $9^{th}$ harmonics in the alternating input current, normalized to the $1^{st}$ harmonic, caused by the controlling of the voltage between the first and second terminals according to the above-described scheme. The magnitude of each harmonic is illustrated using a different dash-dot combination, as indicated in FIG. 7.

In FIG. 7, each magnitude of the harmonics is further divided by the permissible percentage of that harmonic as per IEC 61000-3-2 (a standard). This helps illustrate which harmonic is dominant in meeting requirements for this standard (for the purposes of explanative example).

FIG. 7 further illustrates a THD indication (THD9) for the current, which is based on the first 9 harmonics only.

As can be seen from FIGS. 5 to 7, at a duty-cycle of 33%, controlling the voltage between the first and second terminals does not introduce any $3^{rd}$ and $9^{th}$ harmonic content. Conversely, at 33% duty-cycle there is a substantial $5^{th}$ and $7^{th}$ harmonic content. For some applications this is acceptable, for other applications the resulting $5^{th}$ and/or $7^{th}$ harmonic in the mains current is above the required levels.

FIG. 7 shows that at a duty-cycle of about 38%, the $5^{th}$ harmonic is very low, and the $3^{rd}$, $7^{th}$ and $9^{th}$ harmonic are all almost equal normalized to their required level, and also forms a minimum with respect to the requirements. Consequently, it is proposed that if harmonics requirements are not met at around a 38% duty-cycle, then they are unlikely to be met at other duty-cycles.

As previously discussed, the overall performance of a LED lamp depends upon the selected duty-cycle and the buffer capacitor C2 voltage.

An example of calculating an appropriate duty-cycle (and buffer capacitor C2 voltage) is provided in the context of identifying appropriate values that enable a light to output power in the region of 95 W (from a mains supply). The value of the appropriate duty-cycle and LED string voltage will, of course, depend upon the configuration of the power source.

A search was conducted for possible attractive combinations of duty-cycle and voltage across the (buffer) capacitor C2 (i.e. the maximum voltage between the first and second terminals), determined the required phase shift to get the desired LED power (e.g. a certain wattage, such as 95 W), and determined relevant critical performance parameters.

Table 1 illustrates the results of this search for a first power source (HPI). Table 2 illustrates the results of this search for a second, different power source (SON). Tables 1 and 2 illustrates various performance parameters (Power Factor, THD, H3, H5, H7, H9, H11) for different LED loads and duty-cycles. PF represents the Power Factor of the LED lighting system (i.e. the combination of the LED lamp and the non-mains supply components of the power source), THD represents the total harmonic distortion introduced into the mains supply by the LED lighting system, H3-H11 represent the harmonic current as a percentage of a mains input current for different harmonics (e.g. H3 corresponds to the $3^{rd}$ harmonic, H5 corresponds to the $5^{th}$ harmonic and so on) introduced by operating at the identified duty-cycle.

Where the LED lighting system comprises an ignitor, the C2 voltage $V_C$ is preferably (and for the exemplary tables: is) low enough to prevent or stop the ignitor from generating ignition pulses. Thus, in this scenario, the ignitor has negligible impact on the values provided in the tables.

Referring to FIG. 1, for Table 1, the following component values were used for the first power source: $L_{em}$: 250 mH and $C_{comp}$: 15 µF and, for Table 2, the following component values were used for the second power source: $L_{em}$: 214 mH and $C_{comp}$: 32 µF. In both cases, the target output power of the LED load D6 was 95 W.

From these tables, an appropriate duty-cycle and buffer capacitor voltage $V_C$ for the LED lamp can be selected to meet desired performance criteria.

By way of example, consider a scenario in which the desired performance criteria is to maintain a power factor greater than 0.9, a total harmonic distortion less than 20% and harmonic values meeting the IEC 61000-3-2 criteria (H3<27%, H5<10%, H7<7%, H9<5% and H11<3%).

As can be seen from Table 1, there is only one combination of buffer capacitor voltage $V_C$ and duty-cycle (140V and 0.38 respectively) that meet these desired performance criteria for the LED lamp connected to the first power source.

TABLE 1

| Vc | Duty-cycle | PF | THD (%) | H3(%) | H5(%) | H7(%) | H9(%) | H11(%) |
|---|---|---|---|---|---|---|---|---|
| 130 | 0.333 | 0.76 | 10.2 | 0.2 | 8.8 | 4.4 | 0.04 | 1.8 |
| 130 | 0.35 | 0.79 | 10.6 | 4.6 | 7.5 | 5.3 | 1.5 | 1.0 |
| 130 | 0.38 | 0.84 | 15.2 | 13.3 | 3.5 | 5.1 | 3.4 | 1.2 |
| 140 | 0.333 | 0.84 | 12.3 | 0.2 | 10.6 | 5.4 | 0.05 | 2.2 |
| 140 | 0.35 | 0.88 | 12.8 | 5.5 | 9.0 | 6.4 | 1.8 | 1.2 |
| 140 | 0.38 | 0.92 | 18.2 | 16.0 | 4.2 | 6.1 | 4.0 | 1.5 |
| 150 | 0.333 | 0.92 | 14.5 | 0.2 | 12.6 | 6.4 | 0.05 | 2.6 |
| 150 | 0.35 | 0.95 | 15.0 | 6.4 | 10.6 | 7.6 | 2.1 | 1.4 |
| 150 | 0.38 | 0.97 | 20.9 | 18.3 | 4.8 | 7.0 | 5.04.6 | 1.7 |
| 160 | 0.333 | 0.97 | 16.6 | 0.2 | 14.3 | 7.3 | 0.05 | 3.0 |
| 160 | 0.35 | 0.98 | 16.8 | 7.2 | 11.3 | 8.5 | 2.3 | 1.6 |
| 160 | 0.38 | 0.97 | 22.5 | 19.8 | 5.2 | 7.5 | 5.0 | 1.9 |

As can be seen from Table 2, there are five combinations of string voltage and duty-cycle for which the desired performance criteria are met for the LED lamp connected to the second power source.

From the foregoing, it is apparent that the optimal duty-cycle of the switching arrangement is from 0.25 to 0.5, more preferably between 0.3 and 0.4, more preferably between 0.33 and 0.39 and even more preferably between 0.37 and 0.39, yet more preferably at 0.38.

Similarly, the preferable combined length of operating in the first and second modes may be between 1 and 9 times the cumulative time that the controller operates in the third mode, more preferably between 1.5 and 4 times this cumulative time, more preferably between 1.9 and 3.6 times this cumulative time, more preferably between 2.8 and 3.6 times this cumulative time, and yet more preferably 3.17 this cumulative time.

TABLE 2

| Vc | Duty-cycle | PF | THD (%) | H3(%) | H5(%) | H7(%) | H9(%) | H11(%) |
|---|---|---|---|---|---|---|---|---|
| 100 | 0.333 | 0.99 | 11.1 | 0.2 | 9.6 | 4.9 | 0.03 | 2.0 |
| 100 | 0.35 | 0.99 | 11.1 | 4.8 | 7.8 | 5.6 | 1.6 | 1.0 |
| 100 | 0.38 | 0.97 | 14.7 | 12.9 | 3.4 | 4.9 | 3.3 | 1.2 |
| 110 | 0.333 | 0.96 | 12.0 | 0.2 | 7.2 | 3.7 | 0.02 | 1.5 |
| 110 | 0.35 | 0.94 | 11.7 | 5.1 | 8.3 | 5.9 | 1.6 | 1.1 |
| 110 | 0.38 | 0.89 | 15.2 | 13.3 | 3.5 | 5.0 | 3.4 | 1.2 |
| 120 | 0.333 | 0.88 | 12.1 | 0.2 | 10.4 | 5.3 | 0.03 | 2.2 |
| 120 | 0.35 | 0.84 | 11.7 | 5.1 | 8.2 | 5.9 | 1.6 | 1.1 |
| 120 | 0.38 | 0.78 | 14.8 | 13.0 | 3.4 | 4.9 | 3.3 | 1.2 |
| 140 | 0.333 | 0.68 | 11.2 | 0.2 | 9.7 | 4.9 | 0.04 | 2.0 |
| 140 | 0.35 | 0.64 | 10.7 | 4.6 | 7.5 | 5.4 | 1.5 | 1.0 |
| 140 | 0.38 | 0.59 | 13.3 | 11.6 | 3.0 | 4.4 | 3.0 | 1.0 |

These results indicate that that it is preferred (or even necessary) to run at different (buffer) capacitor C2 voltages for the different types of power source. This can be achieved by switching string voltage (e.g. by selectively bypassing one or more elements of an LED load), or by having a power convertor between buffer capacitor C2 and the LED string.

To avoid causing an ignitor 15B of the power source from operating (if present) there may be a maximum permissible forward voltage of the LED load (and therefore maximum voltage between the first AC1 and second AC2 terminals).

The maximum permissible voltage may be dependent upon the trigger voltage of the ignitor 15B (i.e. a voltage that would trigger the ignitor).

For example, some ignitors may start to generate ignition pulses when the voltage at the input arrangement exceeds 190V, other ignitors may start at a higher voltage. There is therefore a desire to prevent the maximum voltage between the first and second terminals from exceeding such limits.

Figure 8:
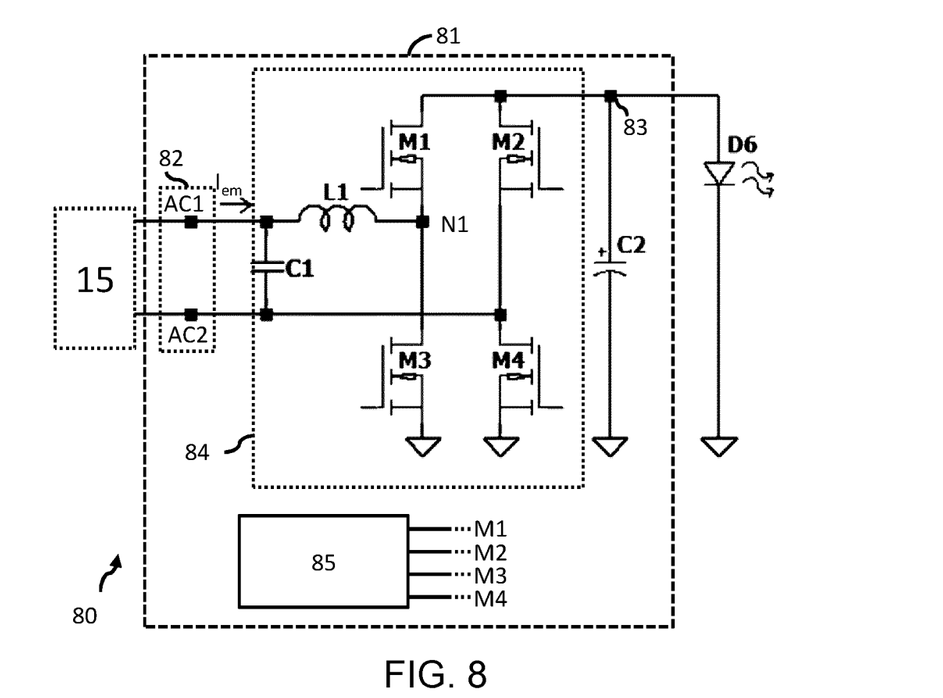
FIG. 8 illustrates an LED lamp having an LED driver according to another embodiment of the invention.

FIG. 8 illustrates an LED lamp 80 comprising an LED load D6 and an LED driver 81 according to another embodiment of the invention.

The LED driver 81 again comprises an input arrangement 82, an output node 83, a switching arrangement 84 and a controller 85.

The LED driver 81 differs from the LED driver 31 described in FIG. 3 in that the switching arrangement 84 further comprises a first inductive element L1 connecting the first terminal to a first intermediate node N1, where the first switch couples to the first intermediate node N1 (instead of directly to the first terminal) and the third switch couples to the first intermediate node (instead of directly to the first terminal).

This effectively enables the LED driver 81 to operate as a switched-mode power supply. This avoids the need to use a switched-mode power supply elsewhere in the LED lighting system (e.g. connected to the output node). This also means that the voltage across the capacitor C2 can be directly controlled, resulting in the ability for an arbitrary LED load D6 to be directly connected to the output node 83.

All switches M1-M4 of the LED driver 31, described in FIG. 3, were switched at the mains frequency (i.e. the frequency of the alternating input current). In the LED driver 81 of FIG. 8, at least two of the switches M1-M4 are switched at a frequency substantially above the mains frequency.

Various different switching schemes could be used to control the flow of current or power between the alternating input current $I_{em}$ and the (buffer) capacitor C2.

In one example, which has been identified as reducing electromagnetic interference (EMI), a switching scheme comprises alternatingly switching the second M2 and fourth M4 switches at a mains frequency. In this switching scheme, the fourth switch M4 should be made conductive (and the second switch M2 made non-conductive) when the voltage of AC1 should be positive with respect to AC2. The second switch M2 should be made conductive (and the fourth switch made non-conductive) when AC2 should be positive with respect to AC1. Deciding when AC1 and AC2 should be positive or negative is made to achieve a desired phase of the voltage between AC1 and AC2 (with respect to the alternating input current $I_{cm}$).

Thus, the second and fourth switches are switched at the mains frequency (i.e. the frequency of the alternating input current $I_{cm}$).

The first M1 and third M3 switch control whether the intermediate node is connected to the (buffer) capacitor C2 (which is effectively held at a constant voltage, being the forward voltage of the LED load D6 in the illustrated example) or the ground/reference voltage. The inductor L1, in combination with the capacitor C1, acts as a low-pass filter.

Controlling the voltage at the intermediate node using, for example using a pulse width modulation (PWM) technique, allows for control over the voltage at the first terminal AC1 in a pseudo-sinusoidal fashion. This allows the voltage between the first and second terminals to be controlled to generate a pseudo-sinusoidal voltage.

In other words, the conductivity of the first M1 and third switches M3 is controlled to vary the duty-cycle of the voltage at the first intermediate node N1 (e.g. with respect to a ground/reference voltage) to match the (HF-averaged) voltage to be generated between the AC1 and AC2 terminals.

Suitable methods of obtaining a desired AC voltage signal between first and second terminals may be adapted from methods employed in class D (switch mode) audio amplifiers. The controller 85 may be adapted to employ such methods.

The coupling capacitor C1 acts to further smooth any high-frequency voltages between the AC1 and AC2 terminals, to further reduce high-frequency harmonic content of the LED lamp (i.e. between the AC1 and AC2 terminals).

Figure 9:
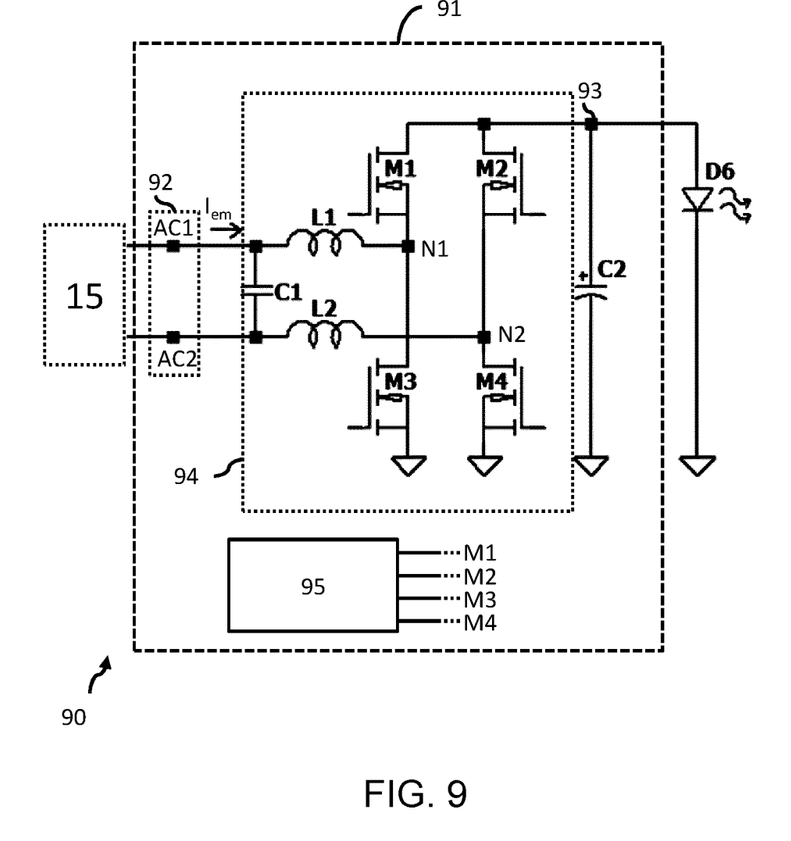
FIG. 9 illustrates an LED lamp having an LED driver according to another embodiment of the invention.

FIG. 9 illustrates an LED lamp 90 comprising an LED load D6 and an LED driver 91 according to another embodiment of the invention.

The LED driver 91 again comprises an input arrangement 92, an output node 93, a switching arrangement 94 and a controller 95.

The LED driver 91 differs from the LED driver 81 described in FIG. 8 in that the switching arrangement 94 further comprises a second inductive element L2 connecting the second terminal AC2 to a second intermediate node N2, where the second switch couples to the second intermediate node N2 (instead of directly to the second terminal) and the fourth switch couples to the second intermediate node (instead of directly to the second terminal).

This allows a controller to use other switching schemes, e.g. such as those employed with full bridge class D amplifiers, to further improve the control over the voltage level between the AC1 and AC2 terminals. The skilled person would be capable of employing such schemes to control the voltage level between the first AC1 and second AC2 terminals.

In such control schemes, both branches M1, M3 and M2, M4 are switching at a high frequency, wherein the duty-cycle of the voltage of the node between M2 and M4 varies in counterphase to the duty-cycle of the voltage of the node between M1 and M3. Preferably, the first intermediate node N1 is controlled to be connected to the (buffer) capacitor C2 when the second intermediate node N2 is controlled to be connected to the ground/reference voltage and vice versa. This can, for example, be achieved by synchronizing driving M1 and M4 in the on-state (and M2 and M3 in the off-state), and driving M2 and M3 in the on-state in synchronicity (and M1 and M4 in the off-state), complementary to on-state control of M1 and M4.

These duty-cycles are then generated using a same PWM method as indicated for the LED lamp 80 described in FIG. 8.

It has been discussed how control methods for class-D amplifiers could be adapted for the present invention.

The main difference between class-D amplifiers and the proposed 4 quadrant SMPS converter rests in the fact that the load of a class-D amplifier is normally a loudspeaker resulting in the average power/energy flow in class-D amplifier being from the DC-side (i.e. a power source) to the AC-side (the loudspeaker).

Conversely, the proposed 4 quadrant SMSP converter at its AC side connects to the first AC1 and second AC2 terminals, where a class-D amplifier connects to the loudspeaker and at its DC side capacitor C2 connects to the LED load D6, where a class-D amplifier connects to its DC power supply.

As such, a class-D amplifier and the proposed 4 quadrant SMPS converter both synthesize an AC voltage at their AC side from the DC voltage at their DC side. But the average power/energy flow is opposite: in a class-D amplifier it is from the DC side to the AC side, in our proposed 4 quadrant SMPS converter it is from the AC side to the DC side.

In the proposed embodiments employing the first and optionally second inductive elements, the voltage waveform synthesized between the nodes AC1 and AC2 would ideally be a perfect sinewave (having substantially, or preferably exactly, the same frequency as the alternating input current $I_{em}$ and having a controllable phase-shift with respect to the alternating input current).

That being said, the voltage waveform (between the first and second terminals) does not need to be a perfect sinewave, but may contain higher harmonics, as long as those harmonics in the AC1, AC2 voltage do not result in harmonic currents in the alternating input current $I_{cm}$ (and therefore the mains current) that exceed the requirements on mains current harmonics.

Embodiments employing the first and optionally second inductive elements could be adapted so that the switching arrangement could also work as a power-factor correction stage through appropriate control of the switching. This is of particular use if there is a desire for the LED lamp to be suitable for connection to a power source that does not comprise one or more of the additional elements beyond the mains supply (e.g. the ballast $L_{em}$, the compensation capacitor $C_{comp}$).

Where the power source comprises only the mains supply, i.e. the LED lamp 90 is directly connected to a mains supply, the switching arrangement 94 may be controlled according to known control mechanism, e.g. utilizing a 2-quadrant control approach.

These embodiments thereby enable the use of a single stage converter LED driver that can be used for different power sources (e.g. comprising or omitting the ballast $L_{em}$ and/or the compensation capacitor $C_{comp}$), the only difference resting in the control method of driving the power switches M1 through M4.

One disadvantage of a 4 quadrant SMSP converter is that the inductive element(s) L1 (and L2) should be able to handle the full averaged alternating input current Tem when the power source comprises an EM ballast, and should not saturate at about 2.5 times the peak of this $T_em$ current. Saturation of the inductor means that the SMSP converter will not work properly as an SMPS. This current is substantially higher than the alternating input current extracted from a mains supply only (i.e. not comprising the EM ballast).

In some examples, it might be possible to run the switching arrangement at the frequency of the alternating input current (i.e. the current of the mains supply) if the power source comprises an EM ballast, and run the switching arrangement as a power factor correction (i.e. in the conventional switched-mode power supply operation) if the power source comprises only a mains supply, i.e. does not comprise an EM ballast. This may allow a smaller inductive element to be used.

Embodiments that do not employ the first (and optionally second) inductive element in the switching arrangement benefit from having a reduced number of components (particularly expensive and/or bulky inductive components) whilst still enabling an improvement in performance characteristics of the overall LED lamp. Such embodiments also have a reduced power loss compared to embodiments employing inductive elements (e.g. due to power loss in the inductive elements).

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A LED driver for generating an output power for driving an LED load from a power source adapted to provide an alternating input current, the LED driver comprising:
   an input arrangement comprising a first terminal and a second terminal, for receiving the alternating input current from the power source;
   an output node for providing an output power for driving the LED load;
   a capacitor connected between the output node and a ground/reference voltage, wherein the capacitor is configured so that, when the LED driver is powered, a voltage across the capacitor is substantially constant;
   a switching arrangement comprising:
      a first switch directly connecting the first terminal to the output node;
      a second switch directly connecting the second terminal to the output node;
      a third switch directly connecting the first terminal to the ground/reference voltage; and
      a fourth switch directly connecting the second terminal to the ground/reference voltage, wherein the switching arrangement is adapted to controllably connect the first terminal to either the output node or the ground/reference voltage and the second terminal to either the output node or the ground/reference voltage to thereby enable control of a magnitude and phase, relative to a phase of the alternating input current, of the voltage between the first and second terminals; and
   a controller adapted to control the switching arrangement to thereby control the magnitude of voltage between the first and second terminals and the phase of the voltage between the first and second terminals relative to a phase of the alternating input current, so that energy transfer between the input arrangement and the output node is bi-directionally controllable to thereby control an average magnitude of the output power,
   wherein the controller is adapted to control the frequency of the voltage between the first and the second terminals to be equal to the frequency of the alternating input current,
   wherein the controller is adapted to be operable in:
      a first mode, in which the controller allows current to flow through the first switch and the fourth switch, and prevents current from flowing through the second switch and the third switch, so that the voltage between the first and second terminals is equal in magnitude and polarity to the voltage across the capacitor;
      a second mode, in which the controller allows current to flow through the second switch and the third switch, and prevents current from flowing through the second switch and the fourth switch, so that the voltage between the first and second terminals is equal in magnitude but opposite in polarity to the voltage across the capacitor; and
      a third mode, in which the controller controls the switching arrangement so that the first and second terminals are effectively short-circuited together,
   wherein the controller is adapted to that the cumulative time that the controller operates in the first or second mode is between 1 and 9 times the cumulative time that the controller operates in the third mode, and preferably between 2.8 and 3.6 times the cumulative time that the controller operates in the third mode.

2. The LED driver of claim 1, wherein the controller is adapted to control the phase of the voltage between the first and second terminals responsive to a control signal indicating a desired magnitude of light to be output by an LED load connectable to the output node.

3. The LED driver of claim 1, wherein the controller is adapted to that the time that the controller operates in the first mode, per one period of the alternating input current, is substantially the same as the time that the controller operates in the second mode, per the same period of the alternating input current.

4. The LED driver of claim 1, wherein the controller is adapted to iteratively perform a sequence of:
   for a first period of time, operating in the first mode;
   for a second, subsequent period of time, operating in the third mode;

for a third, subsequent period of time, operating in the second mode;

for a fourth, subsequent period of time, operating in the third mode.

5. The LED driver of claim 4, wherein the duration of the second period of time and the duration of the fourth period of time are substantially the same, and optionally wherein the duration of the first period of time and the third period of time are substantially the same.

6. The LED driver of claim 3, wherein the controller is adapted to:

operate in the first mode for at least a portion of the time during which the current flow from the alternating input current to the first terminal is positive; and operate in the second mode for at least a portion of the time during which the current flow from the alternating input current to the first terminal is negative.

7. An LED lamp comprising:

the LED driver of claim 1; and an LED load connected to the output node.

8. An LED lighting system comprising the LED lamp of claim 7 and an electromagnetic ballast adapted to connect to a mains supply to provide an alternating input current to the input arrangement of the LED driver.

\* \* \* \* \*